United States Patent
Stadler (10) Patent No.: US 9,885,429 B2
(45) Date of Patent: Feb. 6, 2018

(54) CABLE GUIDANCE DEVICE AND METHOD FOR PRODUCING A CABLE GUIDANCE DEVICE

(71) Applicant: LEONI KABEL HOLDING GMBH, Nuremberg (DE)

(72) Inventor: Wolfgang Stadler, Hilpoltstein (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 14/972,467

(22) Filed: Dec. 17, 2015

(65) Prior Publication Data

US 2016/0178088 A1    Jun. 23, 2016

(30) Foreign Application Priority Data

Dec. 17, 2014 (DE) .................. 10 2014 226 334

(51) Int. Cl.
| | |
|---|---|
| *F16L 3/00* | (2006.01) |
| *F16L 3/015* | (2006.01) |
| *H02G 3/04* | (2006.01) |
| *H02G 11/00* | (2006.01) |

(52) U.S. Cl.
CPC ............ *F16L 3/015* (2013.01); *H02G 3/0487* (2013.01); *H02G 11/00* (2013.01)

(58) Field of Classification Search
CPC ........ H01B 9/006; H02G 1/00; H02G 3/0487; F16L 3/01; F16L 3/015; F16G 13/16
See application file for complete search history.

(56) References Cited

U.S. PATENT DOCUMENTS

| | | |
|---|---|---|
| 5,322,480 A | 6/1994 | Meier et al. |
| 7,504,579 B2 | 3/2009 | Frank |
| 7,942,169 B2 * | 5/2011 | Komiya .................. F16G 13/16 138/110 |
| 8,987,599 B2 * | 3/2015 | Reuss .................. H02G 3/0487 174/113 R |

(Continued)

FOREIGN PATENT DOCUMENTS

| | | |
|---|---|---|
| DE | 102004025371 A1 | 12/2005 |
| DE | 102006009521 B3 | 8/2007 |
| DE | 102007005059 A1 | 7/2008 |

(Continued)

*Primary Examiner* — Amy Sterling
(74) *Attorney, Agent, or Firm* — Laurence A. Greenberg; Werner H. Stemer; Ralph E. Locher (57) ABSTRACT

The cable routing device serves for routing at least one cable of a moved machine part in the manner of a drag chain. The cable routing device is bendable in a reversible manner in at least one defined bending direction and to this end has a flexurally flexible carrier structure, which extends in a longitudinal direction. Embedded into said carrier structure is an insert part with a cross sectional geometry different from circular. The bending direction is determined by the cross sectional geometry of the insert part. The cable routing device, in this case, is realized in the longitudinal direction from a plastic compound by a continuous shaping operation, wherein the insert part is at the same time incorporated into the carrier structure. The cable routing device has cross sectional geometries that vary in the longitudinal direction and are formed by the continuous shaping operation.

15 Claims, 5 Drawing Sheets

(56) References Cited

U.S. PATENT DOCUMENTS

2008/0217487 A1    9/2008  O'Rourke et al.
2015/0179309 A1*   6/2015  Shin ........................ F16G 13/16
                                                          174/135

FOREIGN PATENT DOCUMENTS

| EP | 2722555 A2    | 4/2014  |
| FR | 2871284 A1    | 12/2005 |
| WO | 2006005834 A2 | 1/2006  |
| WO | 2011092991 A1 | 8/2011  |

* cited by examiner

CABLE GUIDANCE DEVICE AND METHOD FOR PRODUCING A CABLE GUIDANCE DEVICE

BACKGROUND OF THE INVENTION

Field of the Invention

The invention relates to a cable routing device and to a method for producing such a cable routing device for at least one cable of a moved machine part, wherein the cable routing device is bendable in a reversible manner in at least one defined bending direction and to this end comprises a flexible carrier structure, which extends in a longitudinal direction and in which an insert part is embedded.

A cable routing device of this type is used in general for connecting a moved machine part which carries out a plurality of movements during its operation. The supply cables, such as, for example, electric cables or leads and also other cables, are in particular exposed to a high bending load or also frictional load as a result. To protect the supply cable, so-called drag chains in which these types of supply cables are routed are frequently used in this connection. These types of drag chains are cable routing devices which are usually formed from individual chain links which are connected together in an articulated manner. However, realizing these types of drag chains requires high expenditure on assembly due to the connection between the individual chain links.

DE 10 2004 025 371 A1 provides a cable routing device where the individual cables are embedded in an integral carrier structure. The carrier structure, in this connection, comprises several ring-shaped segments which are strung together in the longitudinal direction and are strung together along a line by means of a reinforcing band of the carrier structure. In this case, the direction of the reinforcing band defines a bending direction.

Finally, DE 10 2006 009 521 B3 provides a cable routing device for at least one cable of a moved machine part which is bendable in a reversible manner in at least one defined bending direction and to this end comprises a flexurally flexible carrier structure, which extends in a longitudinal direction, is produced from plastics material and in which an insert part is embedded. A U-shaped carrier structure is described herein among other things, pressure-resistant bars and highly tensile fibers being embedded spaced apart from one another in said carrier structure. A defined bending direction is set by choosing the position of the pressure-resistant and highly tensile elements that are spaced apart from one another.

Proceeding from here, the object underlying the invention is to provide a further cable routing device of this type which is simple and cost-efficient to produce.

BRIEF SUMMARY OF THE INVENTION

The object is achieved according to the invention by a cable routing device for at least one cable of a moved machine part. The cable routing device, in this case, is bendable in a reversible manner in at least one defined bending direction and to this end comprises a flexurally flexible carrier structure, which extends in a longitudinal direction and in which an insert part is embedded. The insert part is consequently connected in a fixed and materially bonded manner to the carrier structure. To define the at least one bending direction, the insert part now comprises a defined, cross sectional geometry which deviates from a circular form. To a certain extent said insert part consequently forms a core of the carrier structure and defines at least one predetermined bending direction of the cable routing device in particular as a result of its cross sectional form. Consequently, as a result of said measure, just one single insert part is sufficient and is also only provided in order to achieve the desired determining of the bending direction.

The insert part is generally a flexurally flexible element which extends over the entire length of the cable routing device. The insert part, in this case, consists, for example, of a spring steel or also of a glass-fiber or carbon-fiber-reinforced plastics material with sufficient elasticity. As a result of said material elasticity, the insert part is basically flexurally flexible, the possible bending directions being determined and in particular also defined by its shaping, that is to say by the cross sectional contour. The modulus of elasticity of the insert part, in this case, is in particular within a range of >50 kN/mm$^2$ and, for example, a maximum of approximately 300 kN/mm$^2$. In dependence on the material used, in the case of a fiber-reinforced plastics material, in particular CFRP, it is within the range of 150-230 kN/mm$^2$, in the case of a plastics material reinforced with glass-fibers it is within the range of approximately 55-90 kN/mm$^2$ and in the case of steel it is approximately 190-210 kN/mm$^2$.

The carrier structure is a polymer structure, in particular a thermoplastics material which comprises sufficient bending elasticity. An abrasion-resistant polymer, for example a polyurethane, is used in particular as material for the carrier structure. Depending on the application and load case, other polymers such as PP or PE can also be used.

According to a preferred development, the insert part, in this case, comprises a flat cross sectional geometry such that a width of the insert part in a first transverse direction is therefore greater than a height of the insert part in a second transverse direction. The width, in this case, is in particular a multiple of the height, for example more than five times. All in all, the insert part is consequently realized as a flat band which is incorporated into the carrier structure in the longitudinal direction. As a result of said development, bending the insert part and consequently also the cable routing device overall is only possible about one bending axis parallel to the first transverse direction. Covered, as a result, are the most frequent applications of these types of cable routing devices, where, for example, a length adjustment is necessary in the case of linearly displaceable machine parts and to this end the cables are adjusted, for example, into a U-shaped curve. The cable routing device, in this case, provides suitable routing for a U-shaped bend of this type.

In an expedient further development, in this case, the insert part, when viewed in cross section, is realized in an arched manner in the manner of a portion of a circular arc. The insert part is consequently bent in a concave manner on the one side and in a convex manner on the other side. As a result of said measure, bending about the said first transverse direction is only possible toward one side, namely toward the concavely arched side. Reinforcement is obtained as a result of the convex curvature on the opposite side. As a result, therefore, just one defined bending direction is allowed overall.

In an expedient manner, the carrier structure, when viewed in cross section, comprises a U-shaped cross sectional contour with a base and with two lateral U-shaped legs. The insert part, in this case, is preferably arranged exclusively in the base. A receiving chamber for preferably several cables or leads, in which said cables or leads are able to be inserted loosely, is preferably defined, in this case, between the two U-shaped legs. The base consequently closes the receiving chamber on one side.

In order to make simple bending possible, in particular about the first transverse direction, the U-shaped legs, in this case, when viewed in the longitudinal direction, comprise recurring recesses. Said recesses are realized in particular as slots which are realized in the legs extending from the outside in the direction of the base. The U-shaped legs are legs which are integrally formed in one piece on the base and are therefore realized during the production process at the same time as the overall integral carrier structure. The same also applies to the recesses in the U-shaped legs. Overall, an intermittently recurring structure is produced as a result. The recesses, in this case, are realized as incisions only in the region of the upper end edge of the legs or also as complete separating chambers.

Individual leg elements, which follow on one after another in the longitudinal direction, are realized in particular in an intermittently recurring manner and form support elements of a support structure, are preferably realized as a result of the recesses. Overall, the support structure is consequently a serrated or crenellated structure.

In a preferred further development, said structure allows for a bending where the support elements and consequently the U-shaped legs are directed to an inside surface of the bent cable routing device and the base forms the bent outside surface or is oriented to said outside surface. In the elongated, non-bent state, a space is consequently realized in each case between the support elements such that the carrier elements are able to be moved toward one another.

In a preferred further development, a bending radius is defined in this case insofar as when a minimum bending radius is achieved, adjacent support elements knock into one another by way of their flanks. The minimum bending radius, in this case, is preferably within a range of between 5 mm and 500 mm and in a preferred manner within a range of between 20 mm and 200 mm.

When seen in side view, the support elements widen in this case for example and are approximately triangular, roundedly triangular, semicircular, zigzag or also trapezoidal in development. Common to all variants is that the individual support elements are tapered, proceeding from the base of the U-shaped profile outward to the free end of the respective U-shaped leg. The recesses are realized between two adjacent support elements.

In a preferred further development, the carrier structure comprises separating webs which extend in the longitudinal direction and consequently realize separated part chambers inside the U-shaped cross sectional profile of the support structure. Preferably one cable is inserted in each case into said part chambers such that they are able to be placed side by side in a separated manner inside the carrier structure.

In a preferred development, said separating webs also comprise in this case a support structure like the outer U-shaped legs. At least they comprise recesses in order not to impair the bendability.

In the case of the development where the individual cables are inserted between the two U-shaped legs into the receiving chamber that is defined by the U-shaped legs, it is provided in a preferred development that holding brackets for the cables enclosed in the carrier structure are integrally formed on at least one of the U-shaped legs. In an expedient manner, in this case, holding bracket part pieces, which together cover the receiving chamber and are in particular connectable together, are integrally formed on each of the two oppositely situated U-shaped legs. The receiving chamber is preferably closable in a reversible manner by means of the at least one holding bracket such that the cables are able to be inserted or also exchanged. The holding brackets extend transversely over the receiving chamber and consequently prevent the cables from falling out of the receiving chamber. The holding brackets are integrally formed in particular on the upper end edge of the U-shaped legs and, for example, are connected thereto in a flexible manner such that they are able to be bent away for inserting the cables. The connection to the U-shaped legs is effected, for example, by means of a film hinge.

It is particularly important—similarly to the support structure and the recesses—that said holding brackets are integral parts of the carrier structure, that is to say are produced with said carrier structure in a shaping operation. These are consequently not additional separate parts. The holding brackets are preferably arranged in an intermittently recurring manner over the length of the carrier structure such that the cables are therefore fixed at regular spacings by means of said holding brackets.

In order to ensure defined bending just in one direction, in a preferred further development blocking elements, which restrict and in particular prevent a bending of the cable routing device toward the side of the base located opposite the U-shaped legs, are realized on said side of the base. In a preferred manner, the cable routing device can consequently only be bent toward one side, in such a manner that in the bent state the legs and consequently the support elements are oriented to the bent inside surface. In contrast, the blocking elements are oriented toward the outside surface of the bent cable routing device in the bent state. The blocking elements in particular prevent over-bending in the opposite direction beyond an initial position. Said initial position is in particular an elongated position where the cable routing device extends in a straight cable at least in a part region. As an alternative to this, the initial position can also be a (slightly) bent position. The blocking elements consequently allow for just bending back into an initial position where the cable routing device extends in a straight line. As a result, additional supporting and guiding elements, onto which the cable routing device would otherwise have to be placed for example, are able to be omitted.

Expediently, in this case, the blocking elements are realized in a comparable manner to the support elements by a web, which extends in the longitudinal direction, being provided with slots. However, differently to the support elements, the blocking elements are not tapered toward a free outside surface of the web. Rather, the individual blocking elements comprise a constant width or even widen to the side remote from the base. The width of the individual blocking elements on the side remote from the base, in this case, is dimensioned in such a manner that they abut against one another when the initial position, in particular the elongated position is achieved.

The web can be integrally formed in this case centrally on the base. As an alternative to this, it is also possible to realize several webs such that a quasi U-shaped cross sectional profile is also realized on the second side of the base such that two webs form legs of said U-shaped cross sectional geometry, as is also realized on the opposite side of the base by the U-shaped legs with the support elements. In the case of said realization variant, the cable routing device consequently shows an H-shaped cross sectional contour overall.

In order to keep the load on the enclosed cables on account of a movement of the cables relative to one another and relative to the carrier structure as small as possible, it is provided in an expedient further development that the cables are embedded directly in the carrier structure. As a result, a relative mobility and consequently a load on the respective cable sheathing is avoided as much as possible.

As an alternative to the flatly realized insert part, said insert part is designed in a further preferred realization variant for bendability with several bending directions. A plurality of bending directions and in particular—similarly as to in the case of a bar-shaped element with a circular cross sectional face—arbitrary bending directions are preferably made possible by means of the insert part. For this purpose, the insert part, when seen in cross section, comprises a central region with radial struts. Receiving regions for preferably in each case precisely one cable are realized between said struts. In each case one cable is enclosed in at least some of said receiving regions. The cables, in this case, form a bond with the insert part which is surrounded overall by the carrier structure. The core region, in this case, preferably extends in a neutral fiber of the cable routing device and is realized overall in an approximately strand-shaped manner. As a result, a bending option in all directions perpendicular to the longitudinal direction is made possible.

The insert part, in this case, extends inside the carrier structure in a straight cable in particular precisely along a center axis. Said carrier structure is preferably realized as a circular structure.

However, a helically extending development of the insert part is provided in an expedient development. As a result, the rigidity overall is increased in a suitable manner, at the same time, however, the degrees of bending freedom remain unchanged.

The object is additionally achieved according to the invention by a method for producing a cable routing device, wherein within the framework of a continuous shaping operation a carrier structure, extending in the longitudinal direction, is realized from a plastic compound and in the case of said shaping operation an insert part is incorporated at the same time into the carrier structure. It is particularly important in this connection for the form shaping operation to be a continuous process where individual longitudinal portions are therefore realized consecutively one after another in order consequently to realize the carrier structure as a quasi endless element. The method is consequently not a classic injection molding method where a desired form is realized in an intermittent single-stage process as a result of injecting a molding compound into a mold.

It is of particular importance in this connection that in an expedient development cross sectional geometries which vary also in the longitudinal direction are realized within the framework of said continuous shaping operation. This relates in particular to the special developments of the described U-shaped legs with the recesses and the individual support elements and/or to the development of the holding brackets. In this respect, the production method also differs from a classic conventional extrusion method as in the case of such a method the cross sectional profile is identical over the length.

The production of the cable routing device is effected in this case based on a method concept as is known by the term "exjection" and which is described, for example, in WO 2006/045720 A1. Using said method, it is possible to produce a geometry that is intermittent in the longitudinal direction in a continuous shaping operation. For this purpose, an injection molding machine is combined with a movable, for example rotating cavity or a cavity that is moved in the longitudinal direction. The cavity, in this case, is guided along a gating point. In addition, it is continuously opened and closed during the operation as soon as the injected injection molding compound has sufficiently hardened. Intermittent geometries are therefore continuously produced as a result. In the case of said process, it is also possible for further elements—similarly to in the case of an extrusion process—such as, for example, cables or also the strand-shaped or band-shaped insert part—to be received at the same time and consequently to be sheathed by the carrier structure and embedded therein.

Exemplary embodiments of the invention are explained in more detail below by way of the figures. In partially simplified representations, these are as follows.

BRIEF DESCRIPTION OF THE SEVERAL VIEWS OF THE DRAWING

Identically acting parts are provided with the identical references in the figures.

DESCRIPTION OF THE INVENTION

The various realization variants of a cable routing device 2 shown in the figures serve in general for routing at least one, preferably several cables 4 which connect two machine parts (not shown in any detail here) which are movable relative to one another. The machine parts carry out a plurality of relative movements with respect to one another in operation such that the cable routing device 2 overall is subject to high reverse bending stresses. The cable routing device 2, in this case, is designed in particular for several thousand reverse bending stresses.

The cables 4 are usually realized as strand-shaped elements which are guided in the longitudinal direction 8 in the cable routing device 2. The cables are in particular electric data or supply cables which usually comprise a cable sheathing in which at least one or also preferably several electric conductors or also cores are guided. As an alternative to this, other supply cables such as, for example, hydraulic or pneumatic cables can also be routed. However, the cables 4 are preferably exclusively electric cables.

In addition, it is common in all the realization variants of the cable routing device 2 that said cable routing device comprises a carrier structure 6 which consists of a plastics material and is realized as a continuous, integral shaping element which extends in a longitudinal direction 8 and is produced in a continuous shaping process in the manner of an endless element, that is to say as so-called yard goods.

The carrier structure 6 extends in a first transverse direction 10, which therefore defines a quasi width, and in a second transverse direction 12 which defines a height. Apart from the realization variant in FIG. 7, the carrier structure overall comprises a rectangular cross sectional contour, in the exemplary embodiment in FIG. 7 it has a circular cross sectional geometry.

In addition, it is common in all the realization variants that an insert part 14 is embedded in the carrier structure 6. The entire cable routing device 2 obtains sufficient rigidity by means of said insert part. At the same time, repeated bending of the carrier structure is made possible by said insert part. In particular, at least one predetermined defined bending direction 16 is fixed by the geometry of the insert part.

Figure 1A:
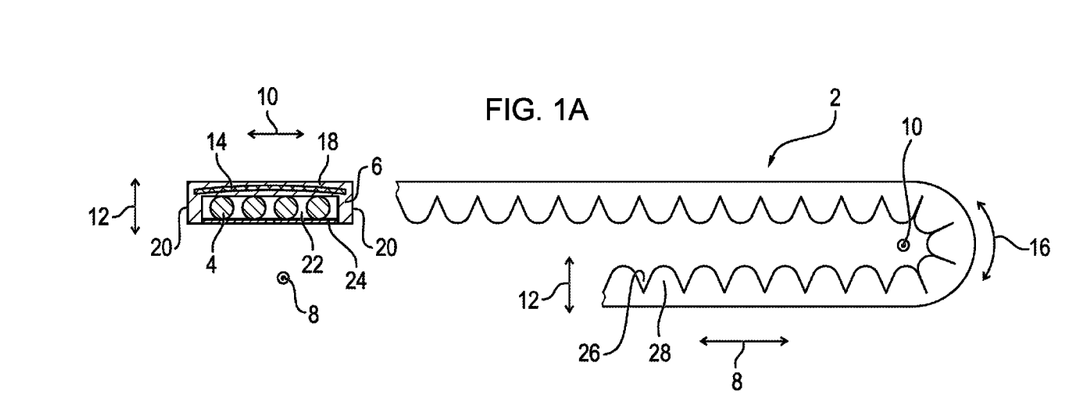
FIG. 1a shows a cross sectional representation and a side view of a cable routing device with cables enclosed therein.
Figure 1B:
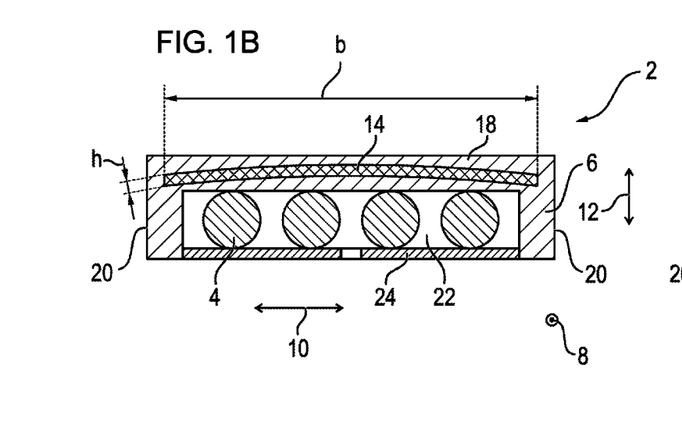
FIG. 1b shows an enlarged representation of the cross sectional representation of the cable routing device according to FIG. 1a, FIG. 2 shows a cross sectional representation of the cable routing device according to a second variant.

In the case of the realization variants according to FIGS. 1a and 1b, the carrier structure 6, when viewed in cross section, is realized in an approximately U-shaped manner and includes a base 18, on the edge of which two U-shaped legs 20 are integrally formed. Between the two U-shaped legs is a free receiving chamber 22, that is to say not filled by the material of the carrier structure 6, in which the several cables 4 extend arranged side by side.

The cables 4 are enclosed loosely in the receiving chamber 22 and are held in said receiving chamber by holding brackets 24 which span over the receiving chamber 22 and are fastened at the sides on the U-shaped legs 20.

The insert part 14 is realized as a flat band and is incorporated in the base 18 of the carrier structure 6.

In the case of the realization variant in FIGS. 1a, 1b, the insert part 14 is realized, in this case, as a band that is arched concavely toward the receiving chamber 22. As a result of said curvature, it is only possible to bend in one direction about the first transverse direction 10. The insert part 14 is consequently, when viewed in cross section, realized in the manner of a circular ring segment. It comprises a width b which preferably extends over the entire width of the base 18 and extends as far as into the lateral U-shaped legs 20. In addition, the insert part 14 comprises a height h which, compared to the width b, is smaller by a multiple.

In order to make it possible for the cable routing device to bend in the bending direction 16 about the first transverse direction 10 in spite of the lateral U-shaped legs 20, recesses 26 which recur in the longitudinal direction 8 are introduced into the U-shaped legs 20.

Overall a support structure with intermittently recurring support elements 28 is realized as a result, as can be seen in particular from the right-hand half of the image in FIG. 1a, that is to say the side view. Said right-hand half of the image shows in this connection a side view of the cable routing device 2 which is bent by 180° about the first transverse direction 10 such that it comprises two part portions extending in opposite directions. A minimum bending radius is established, in this case, by means of the support elements 28 as a result of the support elements 28 abutting against one another by way of their side flanks when the minimum bending radius is achieved. This can be seen in particular in the right-hand region of FIG. 1a, that is to say in the region of the 180° bend of the cable routing device.

Figure 2:
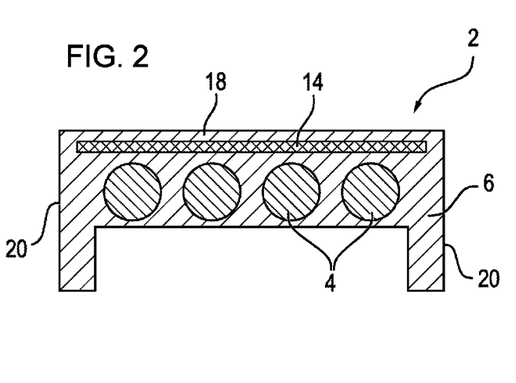

In the case of the realization variant in FIG. 2, a U-shaped carrier structure 6 is once again realized, however now in contrast to the realization variants of FIGS. 1a, 1b, the cables 4 are embedded directly in the carrier structure 6 together with the insert part 14. The U-shaped legs 20 once again—as described for FIG. 1a—comprise recesses 26 with support elements 28 in order to make bending possible. The U-shaped legs 20 do define a receiving space 22 between them which, however, in this respect, is non-functional as it is not provided for receiving cables 4. Rather, the U-shaped legs 20 provide supplementary suitable reinforcement of the cable routing device 2 in order to support just the one defined bending direction 16.

The insert part 14 is realized in the case of the realization variant in FIG. 2 as a simple, flat, non-arched band. As an alternative to this, the insert part 14 is realized as a circular arc segment, similarly as described for FIGS. 1a and 1b.

Figure 3:
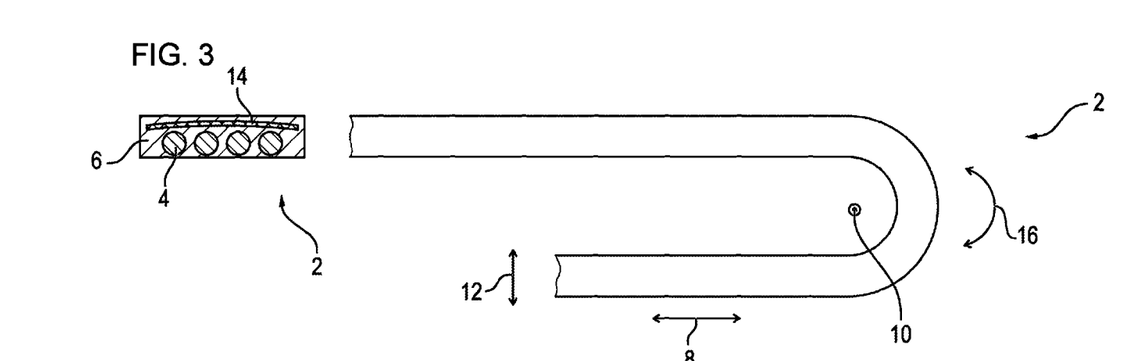
FIG. 3 shows a cross sectional representation and a side view of a further realization variant of a cable routing device with cables embedded in a carrier structure.

The realization variant according to FIG. 3 shows a realization variant similar to FIG. 2, however in contrast hereto no U-shaped legs 20 are realized and the insert part 14, as described for FIGS. 1a and 1b, realizes a circular arc segment. On account of the missing U-shaped legs 20, there is also a smooth side contour, that is to say without recesses 26 and support elements 28, as can be seen in the right-hand half of the image in FIG. 3. FIG. 3 shows, as FIG. 1a, a side representation of a cable routing device 2 bent about 180°.

Both in the case of the variant in FIG. 2 and in FIG. 3, slots, which preferably extend continuously and parallel to the cables 4, are introduced as an option between all or at least some of the cables 4.

Figure 4A:
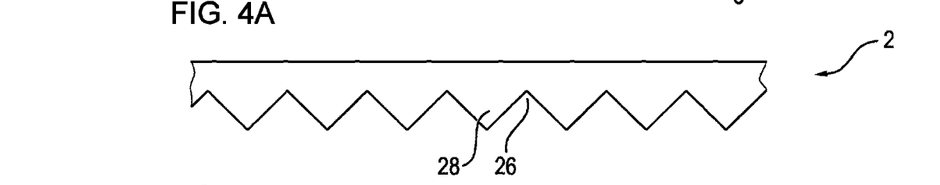
FIG. 4a,4b show partially cutout side views of a cable routing device for illustrating various support structures.
Figure 4B:
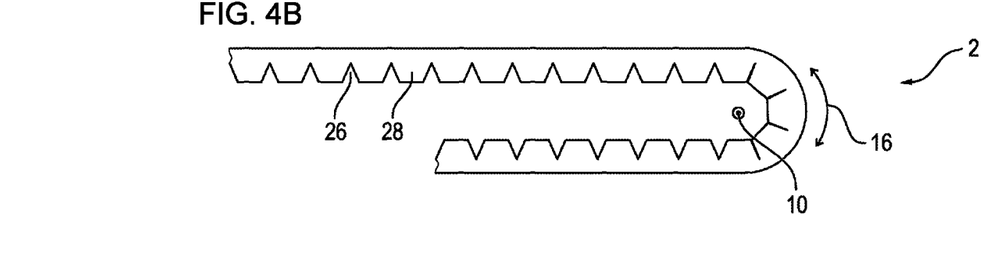

The support structure with the recesses 26 and the support elements 28 shown in the right-hand half of the image in FIG. 1a can in principle be realized differently. What is important is that the support elements 28 realize a respective recess 26 between them at least on their end face remote from the base 18. In this case, the support elements 28 are preferably tapered toward said edge face. The support elements 28 themselves, in this case, can assume different developments. For example, zigzag or triangular support elements 28 are shown in FIG. 4a and in FIG. 4b said support elements 28 are trapezoidal. As an alternative to this, they can also be realized as rounded triangles or also overall as rounded elements, for example in the manner of a semi-circles.

Figure 5:
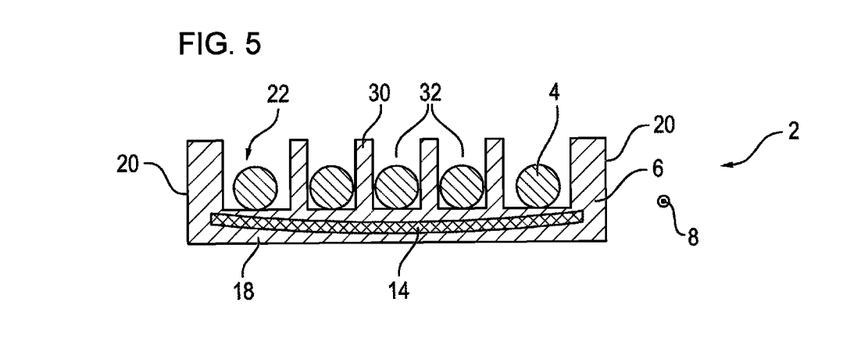
FIG. 5 shows a cross sectional representation of a cable routing device of a further realization variant where several part chambers are realized as a result of separating webs.

FIG. 5 shows finally a further realization variant proceeding from that according to FIGS. 1a and 1b, here the carrier structure 6 additionally also comprising separating webs 30 which extend in the longitudinal direction 8 such that the receiving chamber 22 is divided into several part chambers 32, into each of which one cable 4 is inserted in the exemplary embodiment.

Figure 6A:
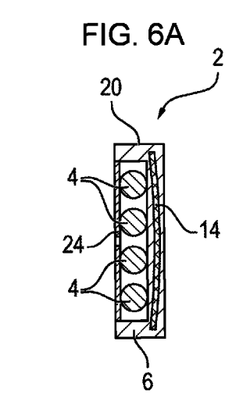
FIG. 6a shows a cross sectional representation of the cable routing device according to the realization variant as shown in FIGS. 1a, 1b
Figure 6B:
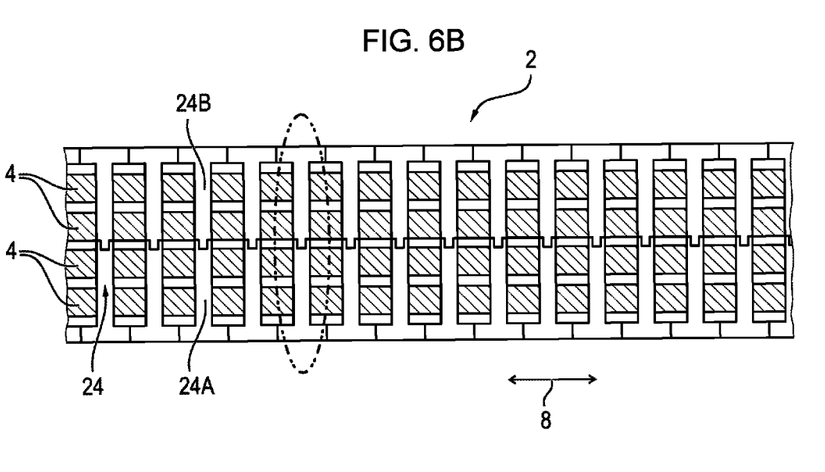
FIG. 6b shows a top view of the cable routing device.
Figure 6C:
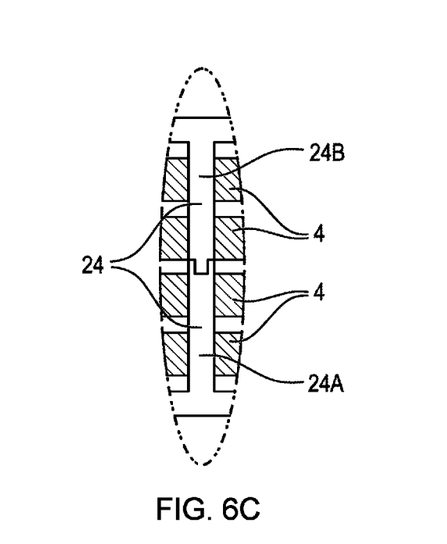
FIG. 6c shows an enlarged representation of the region characterized by an oval in FIG. 6b.

In conjunction with FIGS. 6a, 6b and 6c, a special development of the holding brackets 24 is explained in more detail below. As can be seen in particular from the top view according to FIGS. 6b and 6c, a plurality of holding brackets 24, which are arranged recurring at intermittent spacings, are realized when viewed in the longitudinal direction 8. The holding brackets 24, in this case, are each formed by two bracket parts 24A, 24B which are realized, in particular, as bracket halves and cover the receiving chamber 22 in each case in part. The two bracket parts 24A, 24B are connectable together by way of their free end regions and are closable in particular in a reversible manner. The two bracket parts 24A, 24B can consequently be opened in particular outward in order to enable the cables 4 to be inserted or to enable the cables 4 also to be exchanged. As can be seen in particular from the top view in FIG. 6b, the individual bracket parts 24A each show an approximately T-shaped geometry, the individual T-shaped bars of the bracket parts 24A, 24B being integrally formed on the U-shaped legs 20 and being delimited from one another in particular by separating slots or separating notches.

Figure 7:
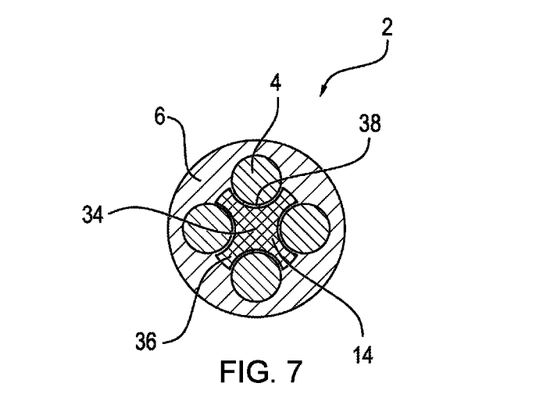
FIG. 7 shows a cross sectional representation of a cable routing device of a further realization variant which allows bending in several bending directions and FIG. 8 shows a side representation of a further realization variant where additional blocking elements are realized.

In the case of the realization variant in FIG. 7, the cable routing device now comprises a circular cross sectional geometry with a circular carrier structure 6, inside which the insert part 14 is embedded along a center longitudinal axis. The insert part 14, in this case, is formed by a central region 34 with integrally formed, somewhat radially protruding struts 36. In this case, receiving regions 38, in each of which one cable 4 is embedded, are realized between the struts 36. The receiving region 38, in this case, comprises in each case a concave curvature which is adapted in particular at least approximately to the curvature of the cable 4. As a result the insert part 14 is realized in a star-shaped or cross-shaped manner overall. As a result of the arrangement of the insert part 14 along the center axis, that is to say in particular along a neutral fiber, in the case of said realization variant a multi-dimensional bending option is now realized such that the entire cable device 2 can therefore be bent not only in one bending direction 16.

In an expedient manner, the insert part 14 according to FIG. 7 is realized extending helically in the longitudinal direction. In the case of said realization variant, the central region 34 is consequently arranged so as to extend helically around the center longitudinal axis. As an alternative to this, it is also possible, proceeding from the variant shown in FIG. 7, for the central region 34 with the integrally formed struts 36 to be simply rotated about the center axis in the longitudinal direction 8 such that the receiving regions 38 extend in a helical manner.

Figure 8:
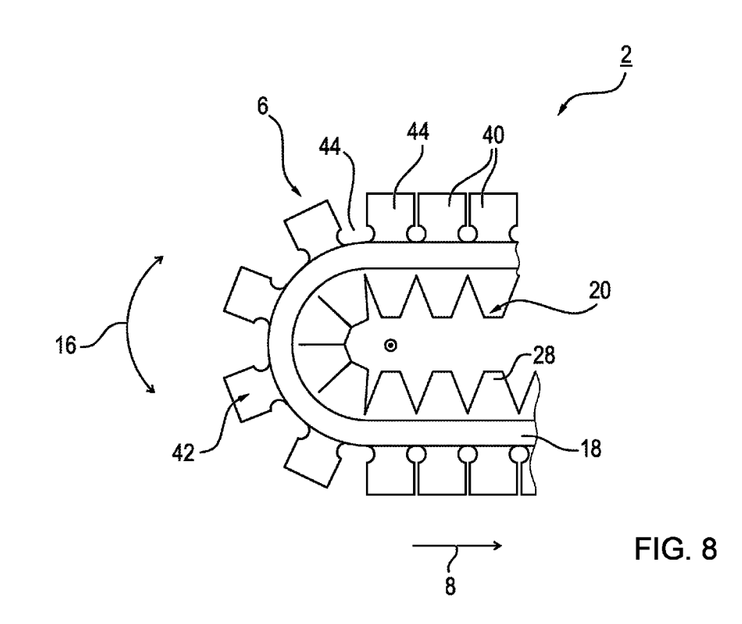

FIG. 8 shows a further realization variant which builds on the realization variants described for FIGS. 1 to 6 and is able to be combined with each of said realization variants.

In the case of the development according to FIG. 8, realized on the rear side of the base are a plurality of individual blocking elements 40, which allow the cable routing device to be bent only in the bending direction 16 and allow for it to be bent back in the opposite bending direction exclusively up to an initial position, namely up to an elongated orientation of the cable routing device 2. The individual blocking elements 40, in this case, are formed by a web 42 which extends in the longitudinal direction 8 and into which slots 44 are introduced in a recurring manner. Two such webs 42, which preferably also realize U-shaped legs, are realized in an expedient manner, as is the case with the support elements 28 on the opposite side.

The blocking elements 40 are also an integral part of the overall carrier structure 6.

In contrast to the support elements 28, which are tapered toward their free side, the blocking elements 40 are realized in a substantially rectangular manner. A constriction is simply provided on a foot of the blocking elements 40 at their junction toward the base 18. This is obtained by a, for example, circular opening at the end of the respective slot 44.

The blocking elements 42 and the support elements 28 preferably comprise a comparable width on the base 18 and/or a comparable height perpendicular to the base 18.

LIST OF REFERENCES

2 Cable routing device
4 Cable
6 Carrier structure
8 Longitudinal direction
10 First transverse direction
12 Second transverse direction
14 Insert part
16 Bending direction
18 Base
20 U-shaped leg
22 Receiving chamber
24 Holding bracket
24A,B Bracket part
26 Recess
28 Support element
30 Separating web
32 Part chamber
34 Central region
36 Strut
38 Receiving region
40 Blocking element
42 Web
44 Slot
b width
h height

The invention claimed is:

1. A cable routing device for at least one cable of a moved machine part, said device comprising:
   a flexurally flexible carrier structure that is reversibly bendable in at least one defined bending direction, said carrier structure extending in a longitudinal direction and being formed from plastics material; and
   an insert part embedded in said flexurally flexible carrier structure, said insert part having a defined cross sectional geometry which deviates from a circular form, said carrier structure having a U-shaped cross sectional contour with a base and two lateral U-shaped legs integrally formed in one piece on said base, and said insert part being arranged in said base for defining a one piece carrier structure, and said insert part being reversibly bendable and running over an entire length of said carrier structure within said base.

2. The cable routing device according to claim 1, wherein said insert part has a flat cross sectional geometry with a width of said insert part being greater in a first transverse direction than a height of said insert part in a second transverse direction, and wherein bending is possible only about the first transverse direction.

3. The cable routing device according to claim 2, wherein said insert part, when viewed in cross section, is arched manner in the manner of a portion of a circular arc such that bending about the first transverse direction is only possible to one side.

4. The cable routing device according to claim 1, wherein said U-shaped legs are formed with recesses which recur in the longitudinal direction and wherein, as a result of the recesses, a support structure produced from periodically recurring support elements is realized which defines a bending radius by adjacent support elements knocking into one another when a bending radius is achieved.

5. The cable routing device according to claim 1, which comprises holding brackets integrally formed directly on said U-shaped legs, said holding brackets recurring on said U-shaped legs and holding cables enclosed in said support structure, wherein one bracket part is integrally formed in each case on each U-shaped leg and the two bracket parts are reversibly connectable together.

6. The cable routing device according to claim 1, which comprises blocking elements disposed to restrict a bending of the cable routing device to an opposite side of said base, said blocking element being formed on a side of said base opposite said U-shaped legs.

7. The cable routing device according to claim 6, wherein said blocking elements are configured to prevent the bending of the cable routing device to the opposite side.

8. The cable routing device according to claim 6, wherein said blocking elements are at least one slotted web integrally formed on said base.

9. The cable routing device according to claim 4, formed by way of a continuous shaping operation as an integral component with a cross sectional geometry that varies in the longitudinal direction.

10. The cable routing device according to claim 1, which comprises separating webs which extend in the longitudinal direction introduced into said carrier structure.

11. The cable routing device according to claim 1, wherein the at least one cable is embedded in said carrier structure.

12. The cable routing device according to claim 1, wherein said insert part is configured for bend ability in a plurality of directions and, as viewed in cross section, is formed by a central region with radial struts, wherein receiving regions are realized between said struts and cables are enclosed at least in some receiving regions and realize a bond with said insert part that is surrounded by said carrier structure.

13. The cable routing device according to claim 10, wherein said insert part extends helically.

14. The cable routing device according to claim 5, wherein said holding brackets each have a T-shaped geometry.

15. A cable routing device for at least one cable of a moved machine part, said device comprising:
 a flexurally flexible carrier structure that is reversibly bendable in at least one defined bending direction, said carrier structure extending in a longitudinal direction and being formed from plastics material; and
 an insert part embedded in said flexurally flexible carrier structure, said insert part having a defined cross sectional geometry which deviates from a circular form, said carrier structure having a U-shaped cross sectional contour with a base and two lateral U-shaped legs integrally formed in one piece on said base, and said insert part being arranged in said base for defining a one piece carrier structure, and said insert part running over an entire length of said carrier structure within said base.

\* \* \* \* \*